United States Patent
Kang et al.

(10) Patent No.: US 12,548,153 B2
(45) Date of Patent: Feb. 10, 2026

(54) METHOD, APPARATUS, AND RECORDING MEDIUM FOR ANALYZING CORONARY PLAQUE TISSUE THROUGH ULTRASOUND IMAGE-BASED DEEP LEARNING

(71) Applicant: ATHEROSOFT, Inc., Seoul (KR)

(72) Inventors: Soo Jin Kang, Seoul (KR); June Goo Lee, Seoul (KR); Hyung Joo Cho, Seoul (KR); Hyun Seok Min, Suwon-si (KR)

(73) Assignee: ATHEROSOFT Inc., Seoul (KR)

( * ) Notice: Subject to any disclaimer, the term of this patent is extended or adjusted under 35 U.S.C. 154(b) by 227 days.

(21) Appl. No.: 18/255,800

(22) PCT Filed: Dec. 2, 2021

(86) PCT No.: PCT/KR2021/018111
§ 371 (c)(1),
(2) Date: Jun. 2, 2023

(87) PCT Pub. No.: WO2022/119347
PCT Pub. Date: Jun. 9, 2022

(65) Prior Publication Data
US 2024/0104725 A1 Mar. 28, 2024

(30) Foreign Application Priority Data
Dec. 2, 2020 (KR) .................. 10-2020-0166972

(51) Int. Cl.
*G06T 7/00* (2017.01)
(52) U.S. Cl.
CPC .. *G06T 7/0012* (2013.01); *G06T 2207/10132* (2013.01); *G06T 2207/20081* (2013.01); *G06T 2207/30101* (2013.01)
(58) Field of Classification Search
None
See application file for complete search history.

(56) References Cited

U.S. PATENT DOCUMENTS

| | | | |
|---|---|---|---|
| 9,235,887 B2 | 1/2016 | Buckler et al. | |
| 2013/0202173 A1* | 8/2013 | Buckler | G06T 7/143 382/131 |
| 2021/0090249 A1* | 3/2021 | Choi | A61B 8/461 |

FOREIGN PATENT DOCUMENTS

| | | |
|---|---|---|
| JP | 2003-503141 A | 1/2003 |
| KR | 10-2016-0047516 A | 5/2016 |

(Continued)

OTHER PUBLICATIONS

Liu Shengnan et al., "Automated Quantitative Assessment of Coronary Calcification Using Intravascular Ultrasound," Ultrasound in Medicine and Biology, vol. 46, No. 10, 2020, pp. 2801-2809, XP093037270.

(Continued)

*Primary Examiner* — Andrew H Lam
(74) *Attorney, Agent, or Firm* — Oblon, McClelland, Maier & Neustadt, L.L.P.

(57) ABSTRACT

A method of analyzing a plaque tissue component based on deep learning, the method including: extracting a plurality of first intravascular ultrasound (IVUS) cross-sectional images into which a first IVUS image that is a preprocedural IVUS image of a patient is divided at predetermined intervals; labeling each of the plurality of first IVUS cross-sectional images by using label indices corresponding to plaque tissue components to form labeled images, performing image conversion to obtain a polar coordinate image through which a distribution of tissue components for each angle is identifiable by performing a coordinate transformation based on the labeled images, extracting a label vector for each angle based on the polar coordinate image, and outputting output data obtained by quantifying the tissue components for each angle by using an artificial intelligence model that is trained by using, as training data, the label vector for each angle.

9 Claims, 9 Drawing Sheets

(56) References Cited

FOREIGN PATENT DOCUMENTS

| KR | 10-2019-0083185 A | 7/2019 |
| KR | 10-2019-0105220 A | 9/2019 |
| WO | WO 01/01864 A1 | 1/2001 |
| WO | WO 2015/030998 A2 | 3/2015 |
| WO | WO 2018/093865 A1 | 5/2018 |

OTHER PUBLICATIONS

Zhifan Gao et al., "Automated Detection Framework of the Calcified Plaque with Acoustic Shadowing in IVUS Images," Plos One, vol. 9, No. 11, Nov. 5, 2014, 18 pages, XP055215949.
Extended European Search Report issued Oct. 24, 2024 in European Patent Application No. 21901035.2, 8 pages.
International Search Report Mar. 8, 2022, in PCT/KR2021/018111, filed on Dec. 2, 2021, 2 pages.
Al-Mallah et al, "Artificial intelligence for plaque characterization: A scientific exercise looking for a clinical application" Atherosclerosis, vol. 288 (2019) 158-159, 3 pages.

* cited by examiner

METHOD, APPARATUS, AND RECORDING MEDIUM FOR ANALYZING CORONARY PLAQUE TISSUE THROUGH ULTRASOUND IMAGE-BASED DEEP LEARNING

CROSS REFERENCE TO RELATED APPLICATIONS

This application is a National Stage entry under 35 U.S.C. § 371 of PCT/KR2021/018111, filed on Dec. 2, 2021, and claims priority to Korean Patent Application No. 10-2020-0166972, filed on Dec. 2, 2020. The entire contents of both are incorporated herein by reference.

TECHNICAL FIELD

The present disclosure relates to an artificial intelligence (AI) system for simulating functions of a human brain, such as recognition or judgment, by using a deep learning algorithm, and applications of the AI system.

More particularly, the present disclosure relates to a method, apparatus, and recording medium for analyzing tissue in a coronary plaque through a deep learning algorithm based on an intravascular ultrasound (IVUS) image of a coronary artery.

BACKGROUND ART

Recently, artificial intelligence systems that simulate human-level intelligence have been used in various fields. An artificial intelligence system enables machines to become smart by learning and making decisions on their own, compared to an existing rule-based smart system. As the artificial intelligence system is more frequently used, the recognition rate of the artificial intelligence system is improved and accurately understands a user's preference, and accordingly, the existing rule-based smart systems have gradually been replaced with deep-learning-based artificial intelligence systems. The artificial intelligence technology includes machine learning (e.g., deep learning) and element technologies utilizing machine learning.

Intravascular ultrasound (IVUS) is a clinical examination method used to recognize morphological features of coronary artery lesions, observe arteriosclerosis, and optimize a stent procedure. Meanwhile, in a case in which a large amount of lipid necrosis components is included in a coronary plaque, the risk of progression of a stenosis lesion and the risk of occurrence of cardiovascular disease (e.g., death, myocardial infarction, or revascularization) may increase. The prognosis of a lesion or the procedure of stenting or the like may vary depending on findings of attenuation in an atherosclerotic plaque and the amount of calcified tissue.

An optical coherence tomography technique or the like is generally used for such analysis of a vulnerable atherosclerotic plaque. However, tissue analysis imaging examinations have issues such as high cost, side effects due to injection of a large amount of contrast medium, limitations in the maximum applicable size of blood vessels, limitations in resolution, or the like. In addition, in image-based tissue analysis of an atherosclerotic plaque, manual quantification takes excessive time, and thus, there is a limit to accurately diagnosing tissue components by using several IVUS image frames of an entire blood vessel.

DESCRIPTION OF EMBODIMENTS

Technical Problem

Embodiments of the present disclosure provide a method, apparatus, and recording medium for automatically analyzing tissue components in a coronary plaque through a deep learning model based on an intravascular ultrasound (IVUS) image.

However, this objective is merely illustrative, and the scope of the present disclosure is not limited thereto.

Solution to Problem

A method of analyzing a plaque tissue component based on deep learning according to an embodiment of the present disclosure includes: extracting a plurality of first intravascular ultrasound (IVUS) cross-sectional images into which a first IVUS image that is a preprocedural IVUS image of a patient is divided at predetermined intervals; labeling each of the plurality of first IVUS cross-sectional images by using label indices corresponding to plaque tissue components; performing image conversion to obtain a polar coordinate image through which a distribution of tissue components for each angle is identifiable, by performing a coordinate transformation based on the labeled images; extracting a label vector for each angle based on the polar coordinate image; and outputting output data obtained by quantifying the tissue components for each angle by using an artificial intelligence model that is trained by using, as training data, the label vector for each angle.

The plaque tissue components may include an attenuation region and a calcification region, and the label indices may include a first index corresponding to the attenuation region and a second index corresponding to the calcification region.

The performing of the image conversion may include: obtaining a Cartesian coordinate image based on the labeled images; and obtaining the polar coordinate image by performing a coordinate transformation on the Cartesian coordinate image.

The extracting of the label vector for each angle may include designating class indices as different pieces of data respectively corresponding to the label indices different from each other, and the label vector for each angle may be a vector representing a distribution of the class indices according to all angles for each of the plurality of first IVUS cross-sectional images.

The outputting may include: assigning different color indices to the different label indices; outputting a label image in which the distribution of the tissue components for each angle is indicated with the color indices at an edge region of a blood vessel; and outputting a color map in which an angular distribution according to positions in a blood vessel region of each of the plurality of first IVUS cross-sectional images.

Meanwhile, a recording medium according to an embodiment of the present disclosure may be a computer-readable recording medium having recorded thereon a program for executing the method of analyzing a plaque tissue component based on deep learning according to the above-described embodiments.

An apparatus for analyzing a plaque tissue component based on deep learning according to an embodiment of the present disclosure may include: a cross-section extraction unit configured to extract a plurality of first IVUS cross-sectional images into which a first IVUS image that is a preprocedural IVUS image of a patient is divided at predetermined intervals; a labeling unit configured to label each of the plurality of first IVUS cross-sectional images by using label indices corresponding to plaque tissue components; an image conversion unit configured to obtain a polar coordinate image through which a distribution of tissue components for each angle is identifiable, by performing a coordinate transformation based on the labeled images; a vector extraction unit configured to extract a label vector for each angle based on the polar coordinate image; and an output unit configured to output output data obtained by quantifying the tissue components for each angle by using an artificial intelligence model that is trained by using, as training data, the label vector for each angle.

Other aspects, features, and advantages than those described above will become clear from the following detailed description, claims, and drawings for carrying out the present disclosure.

Advantageous Effects of Disclosure

According to an embodiment of the present disclosure, there may be provided a method, apparatus, and recording medium for automatically analyzing tissue components in a coronary plaque through deep learning based on a preprocedural IVUS image.

In addition, according to embodiments of the present disclosure, the distribution of attenuation regions and calcification regions in a plaque may be provided to be precisely and easily viewed at a glance, through a quantification algorithm for an intravascular ultrasound (IVUS) image of an entire blood vessel.

In addition, according to embodiments of the present disclosure, a lesion prognosis and an optimal treatment technique according thereto may be provided based on a result of the above-described tissue analysis using only IVUS images.

However, the scope of the present disclosure is not limited by these effects.

MODE OF DISCLOSURE

Figure 1:
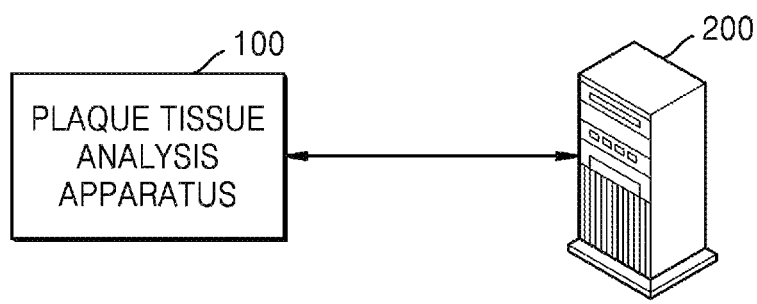
FIG. 1 is a system diagram illustrating a plaque tissue component analysis system according to an embodiment of the present disclosure.

Hereinafter, various embodiments of the present disclosure will be described with reference to the accompanying drawings. Various embodiments of the present disclosure may be variously modified and may have various embodiments, and particular embodiments are illustrated in the drawings and detailed descriptions related to the embodiments are described. However, this is not intended to limit various embodiments of the present disclosure to particular modes of practice, and it is to be appreciated that all changes, equivalents, and/or substitutes that do not depart from the spirit and technical scope of various embodiments of the present disclosure are encompassed in the present disclosure. With regard to the description of the drawings, similar reference numerals are used to refer to similar elements.

As used in various embodiments of the present disclosure, the expressions "include", "may include", and other conjugates refer to the existence of a corresponding disclosed function, operation, or constituent element, and do not limit one or more additional functions, operations, or constituent elements. In addition, as used in various embodiments of the present disclosure, the terms "include", "have", and other conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

As used in various embodiments of the present disclosure, expressions such as "or" include any and all combinations of the listed words. For example, "A or B" may include A, may include B, or may include both A and B.

As used in various embodiments of the present disclosure, expressions such as "first" or "second" may modify various components of various embodiments, but do not limit the components. For example, the expressions do not limit the order and/or importance of the components. The expressions may be used to distinguish one component from another.

It should be understood that, when it is described that an element is "connected" or "coupled" to another element, the first element may be directly connected or coupled to the second element, and a third element may be connected or coupled between the first and second elements. On the other hand, it should be understood that, when it is described that a first element is "directly connected" or "directly coupled" to a second element, no further element is present between the first element and the second element.

As used in embodiments of the present disclosure, terms such as "module", "unit", "part", etc., denote a unit of a component that performs at least one function or operation, and may be implemented as hardware or software or a combination of hardware and software. In addition, a plurality of "modules", "units", "parts", etc. may be integrated into at least one module or chip to be implemented as at least one processor, except for cases in which each of them needs to be implemented as separate particular hardware.

The terms used in various embodiments of the present disclosure are used only to describe a particular embodiment, and are not intended to limit the various embodiments of the present disclosure. A singular expression may include a plural expression unless they are definitely different in a context.

Unless otherwise defined, all terms, including technical and scientific terms, used herein have the same meaning as commonly understood by those of skill in the art to which the present disclosure pertains based on an understanding of the present disclosure.

Terms, such as those defined in commonly used dictionaries, are to be interpreted as having a meaning that is consistent with their meaning in the context of the relevant art and various embodiments of the present disclosure, and are not to be interpreted in an idealized or overly formal sense unless expressly so defined herein.

Hereinafter, various embodiments of the present disclosure will be described in detail with reference to the accompanying drawings.

FIG. 1 is a system diagram illustrating a plaque tissue analysis system 1000 according to an embodiment of the present disclosure.

Referring to FIG. 1, the plaque tissue analysis system 1000 according to the present disclosure may include a plaque tissue analysis apparatus 100 and a server 200.

The plaque tissue analysis apparatus 100 is an apparatus for quantitatively analyzing tissue components of a coronary plaque of a patient, predicting a natural progression of a coronary artery according to a result of the analyzing, and determining required procedure information. The plaque tissue analysis apparatus 100 may identify a high-risk plaque by performing quantitative diagnosis on tissue components in a coronary plaque for each type through an artificial intelligence model based on a preprocedural intravascular ultrasound (IVUS) image of a patient, and provide a guide to an optimal treatment technique for each patient according to a result of the identifying. In detail, the plaque tissue analysis apparatus 100 may perform labeling by using label indices respectively corresponding to different tissue components in the plaque, extract, based on a result of the labeling, a label vector for each angle of a cross section of the IVUS image, and use the extracted label vector for each angle as training data for artificial intelligence of the present disclosure.

The server 200 is at least one external server for training and updating an artificial intelligence model used in an analysis method of the present disclosure, and performing prediction by using the artificial intelligence model.

The server 200 according to an embodiment of the present disclosure may include an artificial intelligence model for analyzing tissue components for each angle of a coronary plaque of a patient. In this case, the artificial intelligence model may be trained by using the label vector for each angle. This will be described in detailed below with reference to the relevant drawings.

Although FIG. 1 illustrates that the plaque tissue analysis apparatus 100 and the server 200 are implemented as separate components, they may be implemented as one component according to an embodiment of the present disclosure. That is, according to an embodiment, the plaque tissue analysis apparatus 100 may be an on-device artificial intelligence device that directly trains and updates an artificial intelligence model.

Figure 2:
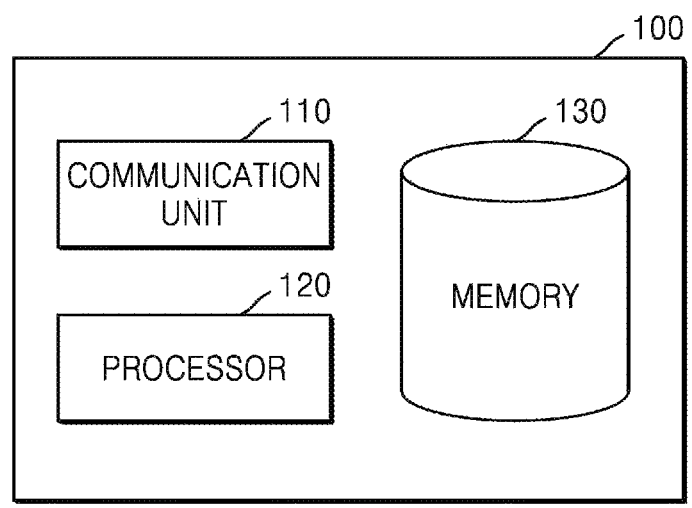
FIG. 2 is a simple block diagram for describing components of a plaque tissue component analysis apparatus according to an embodiment of the present disclosure.

FIG. 2 is a simple block diagram for describing components of the plaque tissue analysis apparatus 100 according to an embodiment of the present disclosure.

Referring to FIG. 2, the plaque tissue analysis apparatus 100 may include a communication unit 110, a processor 120, and a memory 130.

The communication unit 110 may be configured to perform communication with various types of external devices according to various types of communication schemes. The communication unit 110 may include at least one of a Wi-Fi chip, a Bluetooth chip, a wireless communication chip, and a near-field communication (NFC) chip. The processor 120 may communicate with the server 200 or various types of external devices by using the communication unit 110.

In particular, when the Wi-Fi chip or Bluetooth chip is used, various pieces of connection information, such as a service set identifier (SSID) or a session key, may be first transmitted and received, and various pieces of information may be then transmitted and received after a communication connection is established by using the connection information. The wireless communication chip refers to a chip that performs communication according to various communication standards, such as Institute of Electrical and Electronics Engineers (IEEE), Zigbee, $3^{rd}$ Generation (3G), $3^{rd}$ Generation Partnership Project (3GPP), or Long-Term Evolution (LTE). The NFC chip refers to a chip that operates in an NFC scheme using a 13.56 MHz band among various radio-frequency identification (RFID) frequency bands, such as 135 kHz, 13.56 MHz, 433 MHz, 860 MHz to 960 MHz, 2.45 GHz, or the like.

The processor 120 is configured to control the overall operation of the plaque tissue analysis apparatus 100. In detail, the processor 120 controls the overall operation of the plaque tissue analysis apparatus 100 by using various programs stored in the memory 130 of the plaque tissue analysis apparatus 100. For example, the processor 120 may include a central processing unit (CPU), random-access memory (RAM), read-only memory (ROM), and a system bus. Here, the ROM is a component in which a command set for system booting is stored, and the CPU copies an operating system (OS) stored in the memory of the plaque tissue analysis apparatus 100 to the RAM according to a command stored in the ROM, and executes the OS to boot a system. When the booting is completed, the CPU may copy various applications stored in the memory 130 to the RAM, and execute the applications to perform various operations. Although it is described above that the processor 120 includes only one CPU, the processor 120 may be implemented with a plurality of CPUs (or digital signal processors (DSPs), systems on a chip (SoC), etc.).

According to an embodiment of the present disclosure, the processor 120 may be implemented as a DSP, a microprocessor, or a time controller (TCON) for processing a digital signal. However, the present disclosure is not limited thereto, and the processor 120 may include one or more of a CPU, a microcontroller unit (MCU), a microprocessing unit (MPU), a controller, an application processor (AP), a communication processor (CP), or an Advanced Reduced Instruction Set Computer (RISC) Machines (ARM) processor, or may be defined as the corresponding term. In addition, the processor 120 may be implemented as an SoC or large-scale integration (LSI) in which a processing algorithm is embedded, or may be implemented as a field-programmable gate array (FPGA).

A detailed configuration and function of the processor 120 will be described in more detail below with reference to FIGS. 3 to 5.

The memory 130 may store various pieces of data for the overall operation of the plaque tissue analysis apparatus 100, such as a program for the processor 120 to perform processing or control. The memory 130 may temporarily or permanently store all types of data processed by the plaque tissue analysis system 1000. The memory 130 may store a plurality of application programs (or applications) executable by the plaque tissue analysis apparatus 100, and pieces of data and instructions for the operation of the plaque tissue analysis apparatus 100. At least some of the application programs may be downloaded from an external server through wireless communication.

In addition, at least some of the application programs may exist on the plaque tissue analysis apparatus 100 from the time of release for the basic functions of the plaque tissue analysis apparatus 100. The application programs may be stored in the memory 130 to be executed by the processor 120 to perform an operation (or a function) of the plaque tissue analysis apparatus 100. In particular, the memory 130 may be implemented as an internal memory included in the processor 120, such as ROM or RAM, or may be implemented as a separate memory from the processor 120.

Although not illustrated, the plaque tissue analysis apparatus 100 may further include an image obtaining unit and an image processing unit. The image obtaining unit may obtain IVUS image data before a stent procedure, through various sources. For example, the image obtaining unit may be implemented as a commercially available scanner to obtain an IVUS image by scanning the inside of a coronary artery. Image data obtained through the image obtaining unit may be processed by the image processing unit.

As such, according to a plaque tissue analysis method of the present disclosure, a natural progression of a coronary artery and a lesion prognosis may be predicted by identifying the types and risks of tissue components in a plaque based on a preprocedural IVUS image.

The image processing unit may process the image data obtained through the image obtaining unit. The image processing unit may perform various image processing operations, such as decoding, scaling, noise filtering, frame rate conversion, or resolution conversion, on the image data. The image obtaining unit or the image processing unit may transmit an image obtained by each component, to each component of the processor 120 of FIG. 3 to be described below, such that subsequent image processing is performed.

In addition, although not illustrated in FIG. 2, the plaque tissue analysis apparatus 100 may include other components within a range in which a plaque tissue analysis method of the present disclosure may be easily implemented.

Figure 3:
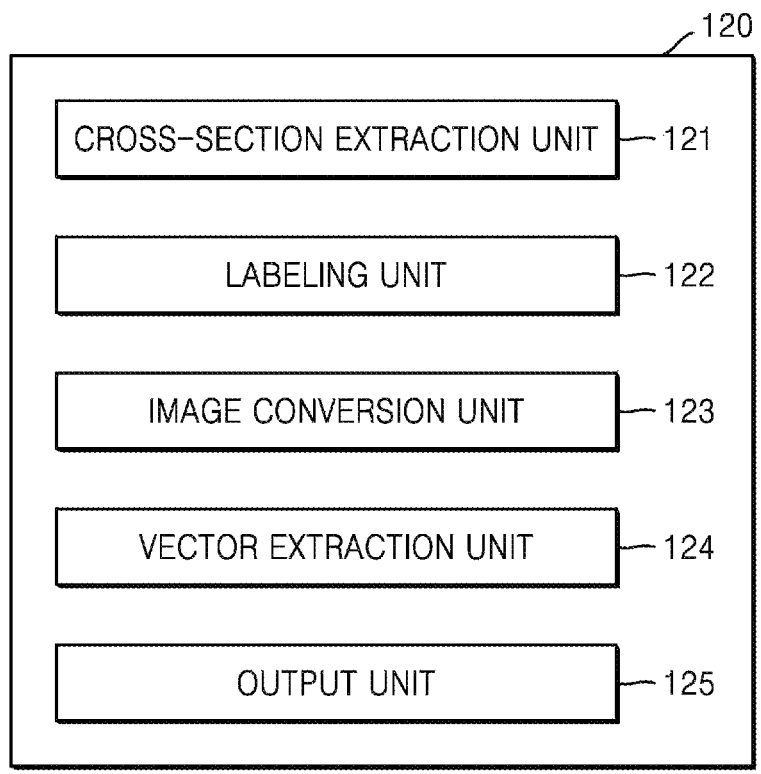
FIG. 3 is a block diagram for describing components of a processor according to an embodiment of the present disclosure.
Figure 4:
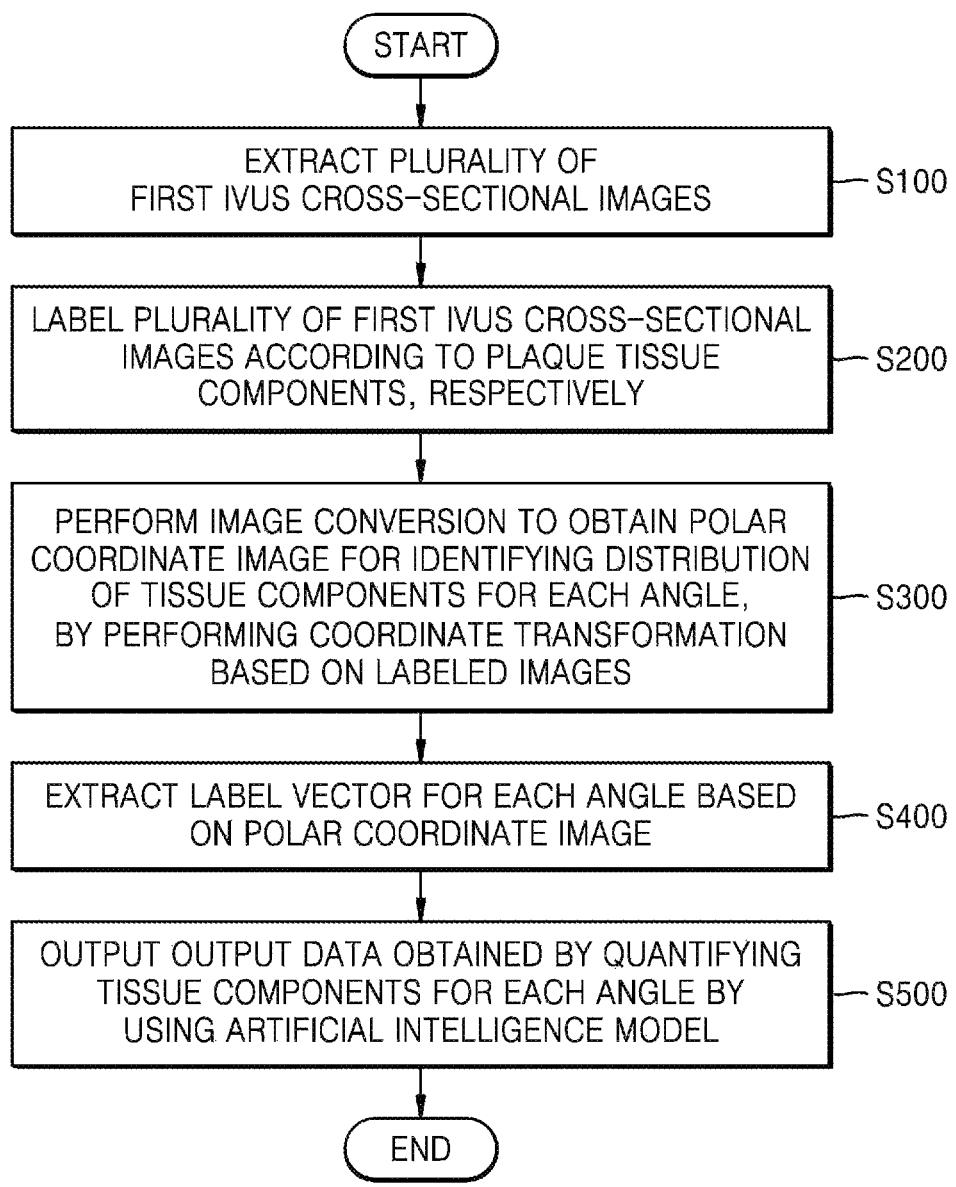
FIG. 4 is a flowchart illustrating a plaque tissue component analysis method according to an embodiment of the present disclosure.

FIG. 3 is a block diagram for describing components of the processor 120 according to an embodiment of the present disclosure.

Referring to FIG. 3, the processor 120 of the present disclosure may include a cross-section extraction unit 121, a labeling unit 122, an image conversion unit 123, a vector extraction unit 124, and an output unit 125.

According to an embodiment of the present disclosure, the cross-section extraction unit 121, the labeling unit 122, the image conversion unit 123, the vector extraction unit 124, and the output unit 125 may be implemented as respective software modules stored in the memory 130 included in the plaque tissue analysis apparatus 100 to be executed by the processor 120. Each of the software modules may perform one or more functions and operations described herein. In addition, the components may be implemented as separate modules or may be implemented as one module.

Meanwhile, according to another embodiment of the present disclosure, the output unit 125 may be a component included in a processor (not shown) of the server 200. In this case, the server 200 may receive, from the plaque tissue analysis apparatus 100, input data including preprocedural IVUS image of a patient and a label vector for each angle obtained by analyzing the IVUS image, and output, based on the received input data, output data including a label image and a color map from which a tissue component distribution for each angle may be identified at a glance.

A detailed operation of each component of the processor 120 will be described in detail below with reference to the drawings.

Hereinafter, a tissue component analysis method of the present disclosure will be described with reference to FIG. 4 together with FIG. 3. FIG. 4 is a flowchart illustrating a plaque tissue component analysis method according to an embodiment of the present disclosure, including both a training operation and a recognition operation.

The cross-section extraction unit 121 extracts a plurality of first IVUS cross-sectional images into which a first IVUS image that is a preprocedural IVUS image of a patient is divided at predetermined intervals (S100). The first IVUS image of the present disclosure may be a preprocedural grayscale image of about 40 MHz of patients with a coronary artery disease, and may be received from the image obtaining unit and image processing unit described above with reference to FIG. 2.

The labeling unit 122 obtains labeled images by labeling the plurality of first IVUS cross-sectional images by using label indices corresponding to plaque tissue components, respectively (S200).

The plaque tissue components may include an attenuation region, a calcification region, and other regions. The attenuation region on the IVUS image means that there is a large amount of lipid necrotic tissue in the plaque, and the lipid necrotic tissue is a risk factor for postprocedural myocardial infarction. Therefore, a lesion prognosis and nonoccurrence of postprocedural reflow may be predicted based on the size of the attenuation region. Meanwhile, as the area of the calcification region in the plaque increases, a predicted possibility of incomplete stent expansion after a procedure increases, and accordingly, the possibility of stent procedure failure (e.g., stent thrombosis, restenosis, etc.) also increases.

The label indices may include a first index corresponding to the attenuation region and a second index corresponding to the calcification region. The first index and the second index may be indicated on portions corresponding to respective regions of a blood vessel in the first IVUS cross-sectional image, and for example, may be indicated on edge regions of the blood vessel. The label indices may be indicated by pixels having different colors, and according to embodiments, may be indicated in various ways to distinguish between tissue components, such as by different patterns.

As such, the plaque tissue component analysis method of the present disclosure may provide an optimal treatment method for each patient by predicting a progression of a coronary artery overall and more accurately by using cross-sectional images of an entire blood vessel including a plaque rather than a 'particular cross-section', and cross-sectional images of the entire blood vessel rather than only a particular part such as a boundary of the blood vessel.

Examples of operations of the cross-section extraction unit 121 and the labeling unit 122 will be described in more detail below with reference to FIG. 5.

The image conversion unit 123 obtains a polar coordinate image for identifying the distribution of tissue components for each angle, by performing a coordinate transformation based on the labeled images (S300). The image conversion operation (S300) may include operations to be described below.

A Cartesian coordinate image is obtained based on the labeled images. Thereafter, a coordinate transformation is performed on the Cartesian coordinate image to obtain a polar coordinate image. Detailed examples of images obtained by the above-described conversion will be described in more detail below with reference to FIG. 6.

The vector extraction unit 124 extracts a label vector for each angle based on the polar coordinate image (S400). The label vector for each angle may be a graph showing the distribution of class indices for each angle with respect to each of the plurality of first IVUS cross-sectional images.

The class indices may be set as different pieces of data corresponding to different label indices, respectively. For example, different class indices may be assigned to the label indices, respectively, and the class indices may be designated with different values. For example, a value of '0' may be assigned to a first index and a value of '1' may be assigned to a second index. The distribution of the class indices according to all angles for each of the first IVUS cross-sectional images may be shown in the label vector for each angle.

Operations of the image conversion unit 123 and the vector extraction unit 124 will be described in detail below with reference to FIGS. 6 and 7.

The output unit 125 outputs output data obtained by quantifying the tissue components for each angle by using an artificial intelligence model that is trained by using, as training data, the label vector for each angle (S500). The outputting operation (S500) may include operations to be described below.

Different color indices may be assigned to the different label indices. According to an embodiment, a color index may be assigned to the class index assigned to each of the label indices. Thereafter, for each of the plurality of first IVUS cross-sectional images, a label image in which the distribution of the tissue components for each angle is indicated with the color indices at an edge region of the blood vessel may be output. Meanwhile, a color map showing an angular distribution for positions in a blood vessel region of each of the plurality of first IVUS cross-sectional images may be output.

An operation of the output unit 125 will be described in more detail below with reference to FIG. 8.

The labeling operation (S200), the image conversion operation (S300), and the operation of extracting the label vector for each angle (S400) are performed by a training unit 1210 (see FIG. 9) of a processor to be described below, and may be performed in an operation of training a recognition model of the training unit 1210. In other words, in the training operation by the training unit 1210, operations S100 to S500 described above may be sequentially performed. Meanwhile, in a recognition (or test) operation by the recognition unit 1220, the output unit 125 may receive a first IVUS image and directly output output data, for example, a label vector for each angle (S600). In other words, in the recognition operation, operation S500 may be performed immediately after operation S100.

Figure 5:
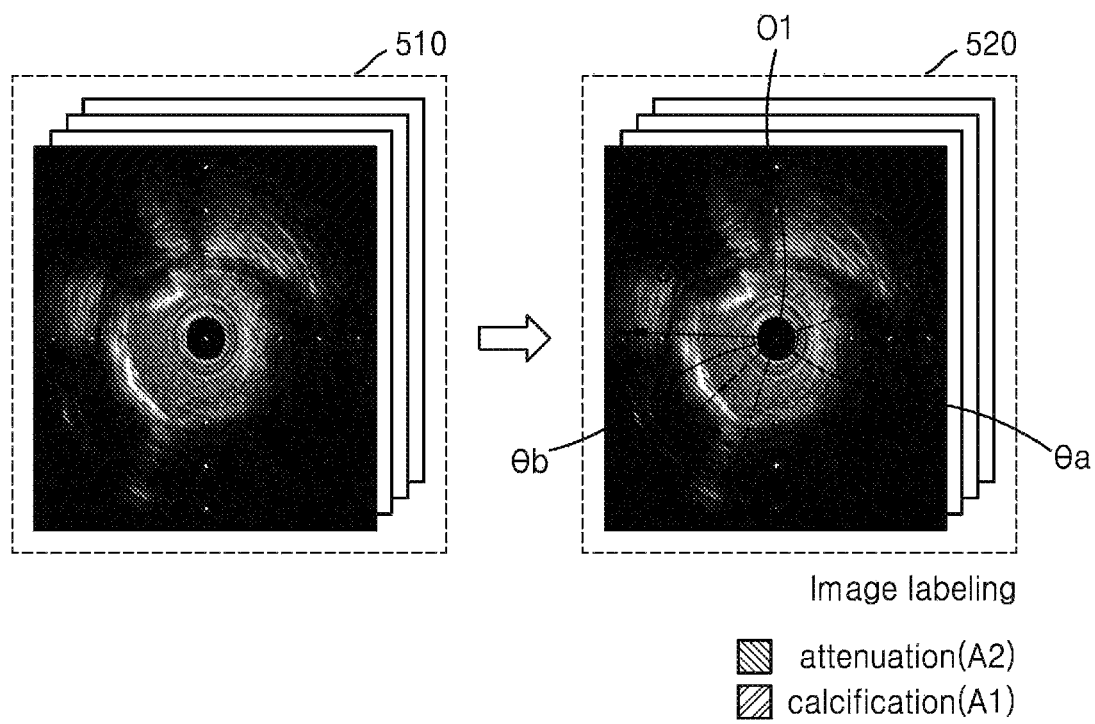
FIG. 5 is a diagram for describing a cross-section extraction operation and a labeling operation according to an embodiment of the present disclosure.

FIG. 5 is a diagram for describing a cross-section extraction operation (S100) and a labeling operation (S200) according to an embodiment of the present disclosure. The operations of FIG. 5 may be performed by the cross-section extraction unit 121 and the labeling unit 122 of the processor 120, or by the processor (not shown) of the server 200.

FIG. 5 illustrates a first IVUS image 510, which is a preprocedural IVUS image of a patient, and a labeled image 520. The first IVUS image 510 includes a plurality of first IVUS cross-sectional images obtained by dividing an image at predetermined intervals. The predetermined interval between the first IVUS cross-sectional images adjacent to each other may be about 0.4 mm, but is not limited thereto.

Thereafter, the labeling unit 122 may obtain the labeled image 520 by labeling the first IVUS image 510 with the above-described label indices. The label indices may include a first index A1 corresponding to an attenuation region, and a second index A2 corresponding to a calcification region. According to the embodiment, the label indices may further include a third index (not shown) corresponding to a region in a plaque other than the attenuation region and the calcification region.

In the labeling operation, different tissue components in the plaque may be determined and labeled as follows. The attenuation region may refer to a region in attenuation is seen in the latter half of a noncalcified plaque, and the calcification region may refer to a region with greater intensity than the surrounding adventitia tissue and accompanied by an acoustic shadow in which sound waves do not propagate to the latter half of the region.

Referring to the labeled image 520, regions at angles ranging from 0° to 360° with respect to a center point O1, which is the center of the plurality of first IVUS cross-sectional images, that is, the center of the blood vessel cross-section, are labeled with label indices respectively corresponding to an attenuation region, a calcification region, and other regions, according to whether the regions correspond to the above regions. For example, the region corresponding to a first angle range θa with respect to the center point O1 is determined as the attenuation region and thus labeled with the first index A1, and the region corresponding to a second angle range θb is determined as the calcification region and thus labeled with the second index A2. Although FIG. 5 illustrates that the other regions are not separately labeled, the other regions may be labeled with a third index different from the first and second indices A1 and A2 according to an embodiment. In this case, the labeling index may be indicated on one edge region such that morphological features of a blood vessel in a blood vessel region are identified.

Figure 6:
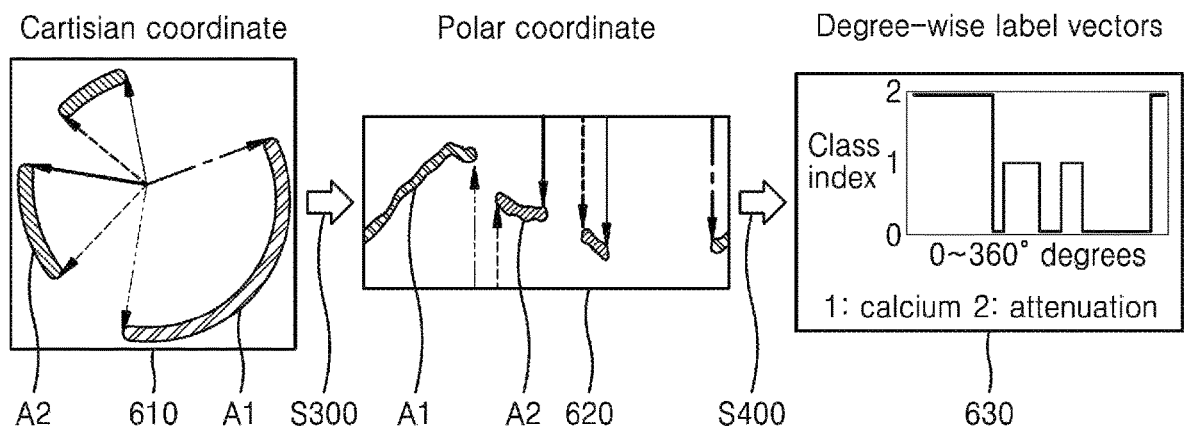
FIG. 6 is a diagram for describing an image conversion operation and a label vector extraction operation according to an embodiment of the present disclosure.

FIG. 6 is a diagram for describing the image conversion operation (S300) and the label vector extraction operation (S400) according to an embodiment of the present disclosure. The operations of FIG. 6 may be performed by the image conversion unit 123 of the processor 120, or by the processor (not shown) of the server 200.

FIG. 6 illustrates a first coordinate image 610, a second coordinate image 620 obtained by performing a coordinate transformation on the first coordinate image 610, and a label vector 630 extracted from the second coordinate image 620. The first coordinate image 610 may be a Cartesian coordinate image, and the second coordinate image 620 may be a polar coordinate image. The labeling unit 122 or the image conversion unit 123 may obtain the first coordinate image 610. The first coordinate image 610 may be an image obtained by removing a blood vessel image from the labeled image 520 described above with reference to FIG. 5, to leave only the label indices. An angular range occupied by each label index may be calculated by using the arrows illustrated in 610.

Thereafter, the image conversion unit 123 may obtain the second coordinate image 620 by performing a coordinate transformation on the first coordinate image 610 by applying the calculated angular range (S300). Referring to 620, an image in which angles are arranged on one axis is illustrated.

Thereafter, the vector extraction unit 124 may extract the label vector 630 for each angle based on the second coordinate image 620 (S400). The label vector for each angle may be a graph showing the distribution of class indices for each angle with respect to each of the plurality of first IVUS cross-sectional images. The class indices may be set as different pieces of data corresponding to different label indices (e.g., A1 and A2), respectively. For example, a value of 2 may be assigned to the first index A1 corresponding to the attenuation region, a value of 1 may be assigned to the second index A2 corresponding to the calcification region, and although not illustrated, a value of 0 different from the values of 1 and 2 may be assigned to other regions. Here, the assigned values of '1' and '2' are the class indices. In addition to the above examples, the class indices may be various numerical values, or may be designated as values such as different characters or symbols, and may be variously set such that different tissue components are distinguished from each other.

As such, according to an embodiment of the present disclosure, the label vector 630 for each angle may allow tissue components in a plaque to be easily identified at a glance through class indices in units of 1° within the range of 0° to 360°, and based on the label vector 630, progression of a coronary artery may be predicted and an optimal coronary artery procedure such as a stent procedure may be determined.

Figure 7:
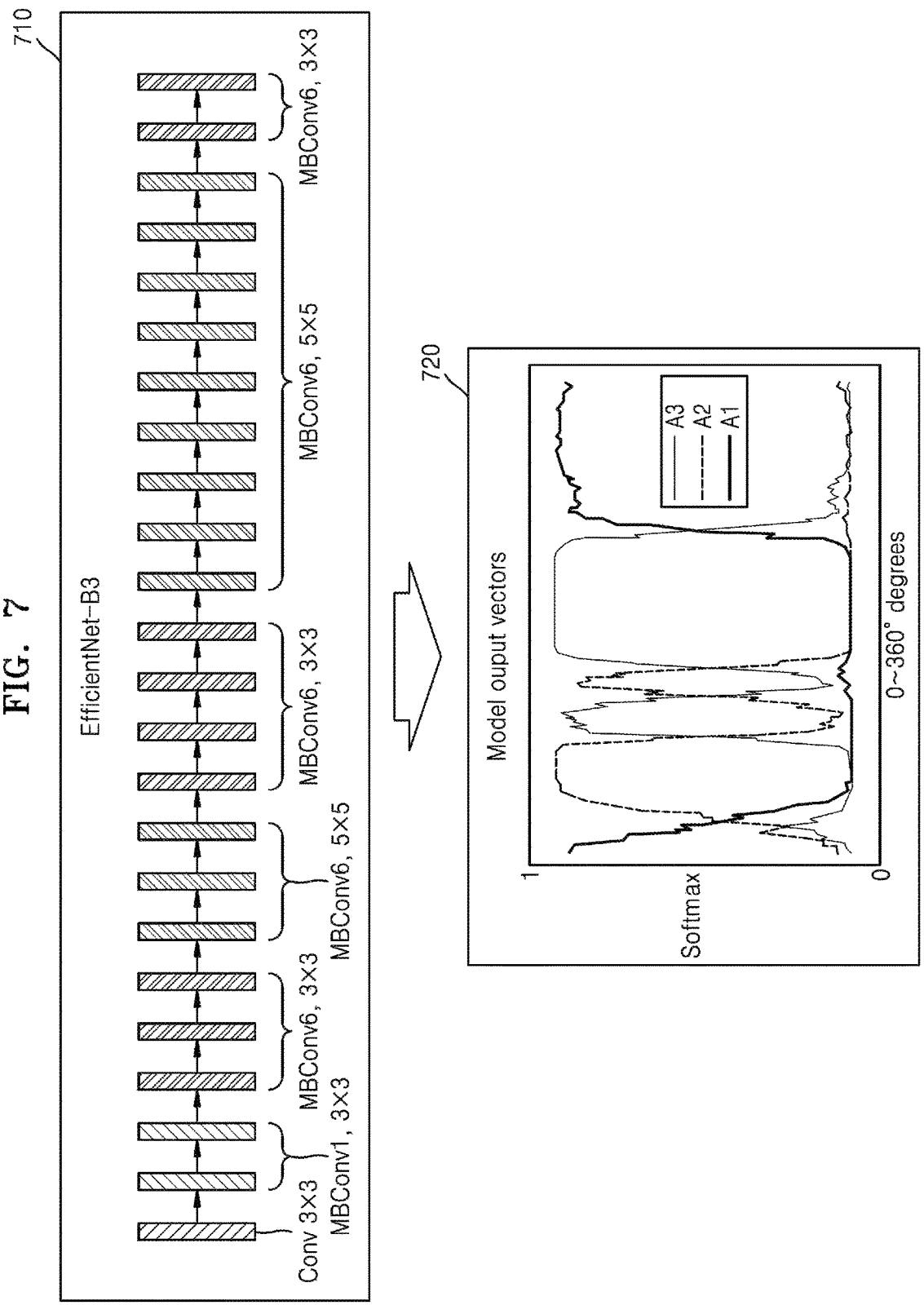
FIG. 7 is a diagram for describing a vector extraction operation using an artificial intelligence model according to an embodiment of the present disclosure.

FIG. 7 is a diagram for describing a vector extraction operation using an artificial intelligence model according to an embodiment of the present disclosure.

FIG. 7 illustrates a first artificial intelligence model 710 and an output vector 720. The first artificial intelligence model 710 may output the output vector 720 by using, as input data, a first IVUS image of a patient or a labeled image.

The first artificial intelligence model 710 is a convolutional neural network (CNN), and may classify, based on input data, tissue components for each angle. For example, the first artificial intelligence model 710 is an EfficientNet model, is composed of a combination of different convolutional networks as illustrated in FIG. 7, and thus may secure accuracy and efficiency. The output vector 720 may represent the distribution of label indices for each angle with respect to the center point of a cross-sectional image, and may have a total vector size of 1080 (360°×3 classes) as illustrated in FIG. 7. The first artificial intelligence model 710 may perform a supplementary or interconversion operation on the label vector 630 for each angle described above with reference to FIG. 6 by using cross-entropy as a loss function. Thereafter, the label vector 630 for each angle and the output vector 720 may be input together as input data into the output unit 125 or another artificial intelligence model on the server 200, and thus, output data described to be below with reference to FIG. 8 may be output.

Figure 8:
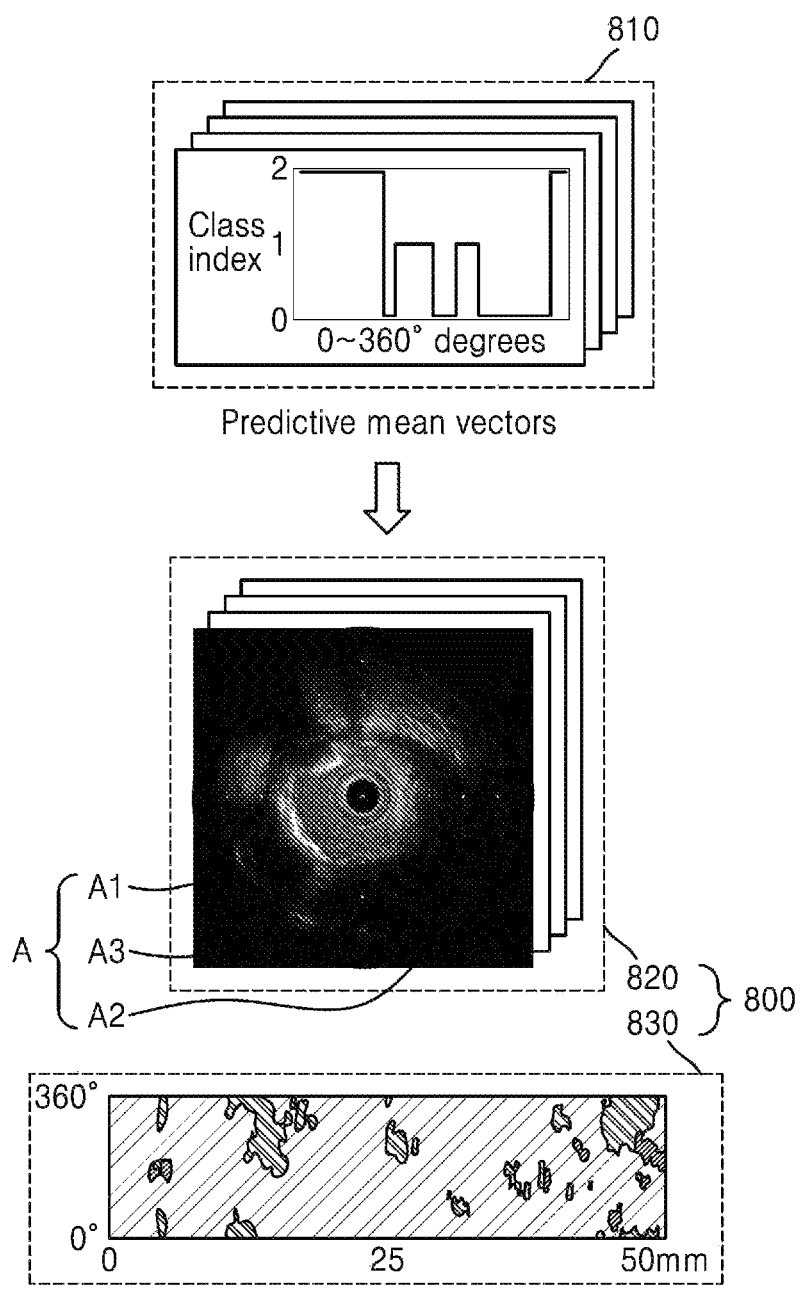
FIG. 8 is a diagram for describing an output operation according to an embodiment of the present disclosure.

FIG. 8 is a diagram for describing the output operation (S500) according to an embodiment of the present disclosure. The operation of FIG. 8 may be performed by the output unit 125 of the processor 120, or by the processor (not shown) of the server 200.

FIG. 8 illustrates input data 810 and output data 800. According to the tissue component analysis method of the present disclosure, image data through which the distribution of tissue components in a plaque on an entire blood vessel may be effectively identified at a glance may be provided. Here, the input data 810 may be a plurality of label vectors for each angle with respect to a plurality of first IVUS cross-sectional images, respectively, or a representative label vector for each angle obtained by calculating mean values of the plurality of label vectors.

Different color indices may be assigned to the different label indices A1, A2, and A3. According to an embodiment, a color index may be assigned to the class index assigned to each of the label indices. Thereafter, for each of the plurality of first IVUS cross-sectional images, a label image 820 representing the distribution of the tissue components for each angle with the color indices may be output to an edge region of the blood vessel.

Meanwhile, a color map 830 showing an angular distribution for positions in a blood vessel region of each of the plurality of first IVUS cross-sectional images may be output. The horizontal axis of the color map 830 may represent a total length l (in mm) of a region of interest within a blood vessel of a patient, that is, a plaque region, and the vertical axis may represent an angle (0° to 360°) with respect to the center point of the blood vessel cross-section described above. In the color map 830, color indices corresponding to respective pixels (coordinates) are assigned and represented on a graph with the above axes. The color map 830 is shown together with the label image 820, such that the distribution of the tissue components in the coronary artery and the resulting risk may be predicted accurately and efficiently.

According to an embodiment, the output unit 125 of the present disclosure or the processor (not shown) of the server 200 may further utilize clinical features of each patient as input data. For example, clinical features may include, but is not limited to, an age, a gender, a body surface area, an involved segment, and involvement of proximal left anterior descending artery (LAD), a vessel type and the like.

As such, according to the plaque tissue component analysis method according to an embodiment of the present disclosure, according to embodiments of the present disclosure, the distribution of attenuation regions and calcification regions may be provided to be identified precisely and easily at a glance. In addition, a lesion prognosis and an optimal treatment technique according thereto may be provided based on a result of the above-described tissue analysis using only IVUS images.

Figure 9:
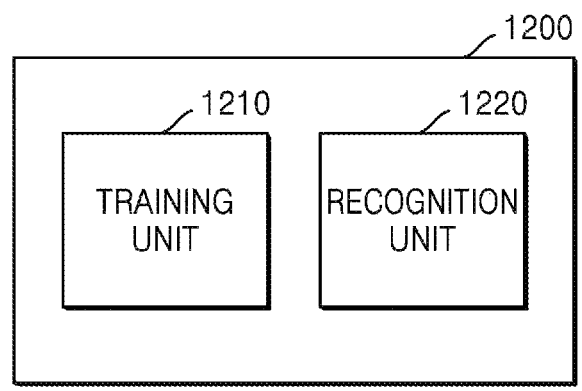
FIG. 9 is a block diagram illustrating a training unit and a recognition unit according to various embodiments of the present disclosure.

FIG. 9 is a block diagram illustrating the training unit 1210 and a recognition unit 1220 according to various embodiments of the present disclosure.

Referring to FIG. 9, a processor 1200 may include at least one of the training unit 1210 and the recognition unit 1220. The processor 1200 of FIG. 9 may correspond to the processor 120 of the plaque tissue analysis apparatus 100 of FIG. 2 or the processor (not shown) of the server 200.

The training unit 1210 may generate or train a recognition model having a criterion for determining a certain situation. The training unit 1210 may generate a recognition model having a criterion, by using collected training data.

For example, the training unit 1210 may generate, train, or update an object recognition model having a criterion for classifying tissue components in an atherosclerotic plaque in an IVUS image, by using, as training data, a first IVUS image composed of a plurality of first IVUS cross-sectional images, a labeled image obtained based on the first IVUS image, a coordinate image, a label vector for each angle, and the like.

As another example, the training unit 1210 may generate, train, or update a model having a criterion for determining a natural progression of a coronary artery of a patient, a lesion prognosis, and a postprocedural progression including the area of a stent, whether the stent is to be incompletely expanded, and the like, by using the above-described input data as training data.

The recognition unit 1220 may estimate desired data (e.g., the output data 800 (see FIG. 8)) by using certain data as input data for the trained recognition model. For example, the recognition unit 1220 may provide output data in which the distribution of tissue components for each angle in a plaque is quantified and visualized by applying the above-described input data to the trained recognition model. The recognition unit 1220 may not perform the labeling operation (S200), the image conversion operation (S300), and the operation of extracting the label vector for each angle (S400).

For example, in the present disclosure, patients whose first IVUS images are obtained are classified into a training group to be used by the training unit 1210 and a test group to be used by the recognition unit 1220 in a ratio of 5:1, and the first IVUS images may be used to train an artificial intelligence models and generate output data, respectively.

At least a portion of the training unit 1210 and at least a portion of the recognition unit 1220 may be implemented as a software module or manufactured in the form of at least one hardware chip, and then mounted on the plaque tissue analysis apparatus 100. For example, at least one of the training unit 1210 and the recognition unit 1220 may be manufactured in the form of a dedicated hardware chip for artificial intelligence, or manufactured as a part of an existing general-purpose processor (e.g., a CPU or an AP) or a dedicated graphics processor (e.g., a graphics processing unit (GPU)), and then mounted on various electronic devices or object recognition devices described above. Here, the dedicated hardware chip for artificial intelligence is a dedicated processor specialized in probability calculation, and may quickly process calculation tasks in the field of artificial intelligence such as machine learning, with higher parallel processing performance than that of existing general-purpose processors.

In a case in which the training unit 1210 and the recognition unit 1220 are implemented as software modules (or program modules including instructions), the software modules may be stored in non-transitory computer-readable media. In this case, the software modules may be provided by an OS or by a certain application. Alternatively, a part of the software module may be provided by the OS, and the other part may be provided by the certain application.

In this case, the training unit 1210 and the recognition unit 1220 may be mounted on one electronic device, or may be mounted on separate electronic devices, respectively. For example, any one of the training unit 1210 and the recognition unit 1220 may be included in the plaque tissue analysis apparatus 100 and the other may be included in the server 200. In addition, the training unit 1210 and the recognition unit 1220 may provide the recognition unit 1220 with information about a model established by the training unit 1210 through wired or wireless communication, and data input to the recognition unit 1220 may be provided as additional training data to the training unit 1210.

Meanwhile, the above-described methods according to various embodiments of the present disclosure may be implemented in the form of an application that may be installed in an existing electronic device.

Meanwhile, according to an embodiment of the present disclosure, the various embodiments described above may be implemented as software including instructions stored in a recording medium that is readable by a computer or similar device, by using software, hardware, or a combination thereof. In some cases, the embodiments described herein may be implemented as a processor. According to software implementation, embodiments such as procedures or functions described herein may be implemented as separate software modules. Each of the software modules may perform one or more functions and operations described herein.

A device-readable recording medium may be provided in the form of a non-transitory computer-readable recording medium. Here, the term 'non-transitory' simply means that the storage medium is a tangible device, and does not include a signal, but this term does not differentiate between where data is semi-permanently stored in the storage medium and where the data is temporarily stored in the storage medium. Here, the non-transitory computer-readable medium refers to a medium that does not store data for a short time like a register, a cache memory, a memory, and the like, but semi-permanently stores data and is readable by a device. Specific examples of non-transitory computer-readable media may include a compact disc (CD), a digital video disc (DVD), a hard disk, a Blu-ray disc, a Universal Serial Bus (USB) drive, a memory card, ROM, and the like.

Although the present disclosure has been described with reference to the embodiments illustrated in the drawings, they are merely exemplary, and it will be understood by one of skill in the art that various modifications and equivalent embodiments may be made therefrom. Therefore, the true technical protection scope of the present disclosure should be determined by the appended claims.

The invention claimed is:

1. A method of analyzing a plaque tissue component based on deep learning, the method comprising:
   extracting, by a plaque tissue analysis apparatus, a plurality of first intravascular ultrasound (IVUS) cross-sectional images into which a first IVUS image that is a preprocedural IVUS image of a patient is divided at predetermined intervals;
   labeling, by the plaque tissue analysis apparatus, each of the plurality of first IVUS cross-sectional images by using label indices corresponding to plaque tissue components to form labeled images;
   performing, by the plaque tissue analysis apparatus, image conversion to obtain a polar coordinate image through which a distribution of tissue components for each angle is identifiable, by performing a coordinate transformation based on the labeled images;
   extracting, by the plaque tissue analysis apparatus, a label vector for each angle based on the polar coordinate image; and
   outputting, by the plaque tissue analysis apparatus, output data obtained by quantifying the tissue components for each angle by using an IVUS image as input data to a machine-learned deep learning model that is trained by using, as training data, the label vector for each angle; and
   determining, by the plaque tissue analysis apparatus, a distribution of attenuation regions and calcification regions within the plaque tissue, based on the output data obtained based on the deep learning model.

2. The method of claim 1, wherein the plaque tissue components comprise the attenuation regions and the calcification regions, and
   the label indices comprise a first index corresponding to the attenuation regions and a second index corresponding to the calcification regions.

3. The method of claim 2, wherein the extracting of the label vector for each angle further comprises designating class indices as different pieces of data respectively corresponding to the label indices different from each other, and
   wherein the label vector for each angle is a vector representing a distribution of the class indices according to all angles for each of the plurality of first IVUS cross-sectional images.

4. The method of claim 2, wherein the outputting further comprises:
   assigning different color indices to the different label indices;
   outputting a label image in which the distribution of the tissue components for each angle is indicated with the color indices at an edge region of a blood vessel; and outputting a color map in which an angular distribution according to positions in a blood vessel region of each of the plurality of first IVUS cross-sectional images.

5. The method of claim 4, further comprising displaying the color map together with the label image.

6. The method of claim 1, wherein the performing of the image conversion further comprises:
obtaining a Cartesian coordinate image based on the labeled images; and
obtaining the polar coordinate image by performing a coordinate transformation on the obtained Cartesian coordinate image.

7. A non-transitory computer-readable recording medium having recorded thereon a program for executing the method of claim 1.

8. The method of claim 1, further comprising displaying a label image representing the determined distribution of the attenuation regions and the calcification regions.

9. An apparatus for analyzing a plaque tissue component based on deep learning, the apparatus comprising:
a cross-section extraction unit configured to extract a plurality of first intravascular ultrasound (IVUS) cross-sectional images into which a first IVUS image that is a preprocedural IVUS image of a patient, is divided at predetermined intervals;
a labeling unit configured to label each of the plurality of first IVUS cross-sectional images by using label indices corresponding to plaque tissue components to form labeled images;
an image conversion unit configured to obtain a polar coordinate image through which a distribution of tissue components for each angle is identifiable, by performing a coordinate transformation based on the labeled images;
a vector extraction unit configured to extract a label vector for each angle based on the polar coordinate image; and
an output unit configured to output output data obtained by quantifying the tissue components for each angle by using an IVUS image as input data to a machine-learned deep learning model that is trained by using, as training data, the label vector for each angle, and determine the distribution of attenuation regions and calcification regions within the plaque tissue based on the output data obtained based on the deep learning model.

* * * * *